US011604500B2

(12) United States Patent
Takahashi

(10) Patent No.: US 11,604,500 B2
(45) Date of Patent: Mar. 14, 2023

(54) ELECTRONIC EQUIPMENT, POWER SUPPLY METHOD OF ELECTRONIC EQUIPMENT, POWER RECEPTION METHOD OF ELECTRONIC EQUIPMENT, AND INTERFACE CABLE

(71) Applicant: SONY CORPORATION, Tokyo (JP)

(72) Inventor: Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 16/095,178

(22) PCT Filed: Apr. 12, 2017

(86) PCT No.: PCT/JP2017/014914
§ 371 (c)(1),
(2) Date: Oct. 19, 2018

(87) PCT Pub. No.: WO2017/187976
PCT Pub. Date: Nov. 2, 2017

(65) Prior Publication Data
US 2019/0146563 A1 May 16, 2019

(30) Foreign Application Priority Data
Apr. 27, 2016 (JP) .............................. JP2016-088954

(51) Int. Cl.
*G06F 1/26* (2006.01)
*H02J 1/08* (2006.01)
(Continued)

(52) U.S. Cl.
CPC .......... *G06F 1/266* (2013.01); *G05B 19/042* (2013.01); *G06F 1/26* (2013.01); *G06F 13/385* (2013.01);
(Continued)

(58) Field of Classification Search
CPC .......... G06F 1/266; G06F 1/26; G06F 13/385; G06F 13/40; G05B 19/042; H01R 24/28; H02J 1/00; H02J 1/08
See application file for complete search history.

(56) References Cited

U.S. PATENT DOCUMENTS 7,021,971 B2 * 4/2006 Chou ............... G06K 19/07732
439/660
8,301,831 B2 * 10/2012 Ni ........................... G06F 21/32
711/103
(Continued)

FOREIGN PATENT DOCUMENTS

CN 104978296 A 10/2015
CN 105045738 A 11/2015
(Continued)

OTHER PUBLICATIONS

International Search Report and Written Opinion of PCT Application No. PCT/JP2017/014914, dated Jun. 13, 2017, 10 pages of ISRWO.
(Continued)

*Primary Examiner* — Brian T Misiura
(74) *Attorney, Agent, or Firm* — Chip Law Group

(57) ABSTRACT

It is intended to achieve excellent supply of power to connection destination equipment. Electronic equipment includes a receptacle having a plurality of electric terminal sets. The electric terminal sets each include a first electric terminal for power, a second electric terminal for detection, and a third electric terminal for grounding. A configuration of an interface cable connected to the receptacle is identified on the basis of signals acquired from the second electric terminals of the plurality of electric terminal sets. Power is supplied to external equipment through the first electric
(Continued)

terminals of some or all of the plurality of electric terminal sets in accordance with the identified cable configuration.

8 Claims, 11 Drawing Sheets

(51) Int. Cl.
G05B 19/042 (2006.01)
G06F 13/38 (2006.01)
G06F 13/40 (2006.01)
H01R 24/28 (2011.01)

(52) U.S. Cl.
CPC .............. *G06F 13/40* (2013.01); *H01R 24/28* (2013.01); *H02J 1/08* (2013.01)

(56) References Cited

U.S. PATENT DOCUMENTS

| | | | | |
|---|---|---|---|---|
| 8,504,853 | B2 * | 8/2013 | Carlsen | G06F 13/4081 713/300 |
| 9,665,150 | B2 * | 5/2017 | Sakashita | G06F 1/266 |
| 9,804,984 | B2 * | 10/2017 | Yin | G06F 13/4282 |
| 9,904,267 | B2 * | 2/2018 | Tupala | G06F 1/266 |
| 10,467,167 | B2 * | 11/2019 | Yakame | G06F 13/4022 |
| 2012/0042120 | A1 * | 2/2012 | Ni | G06F 21/78 711/103 |
| 2013/0217253 | A1 * | 8/2013 | Golko | H01R 13/58 439/692 |
| 2015/0269102 | A1 | 9/2015 | Inha et al. | |
| 2015/0293514 | A1 | 10/2015 | Tupala | |
| 2015/0301552 | A1 * | 10/2015 | Lim | G01K 7/16 327/538 |
| 2015/0346794 | A1 | 12/2015 | Sakashita et al. | |
| 2016/0349292 | A1 * | 12/2016 | Atkinson | G01R 31/58 |

FOREIGN PATENT DOCUMENTS

| | | |
|---|---|---|
| CN | 105278650 A | 1/2016 |
| EP | 2924584 A2 | 9/2015 |
| EP | 2930588 A1 | 10/2015 |
| JP | 2015-201180 A | 11/2015 |
| JP | 2015-212930 A | 11/2015 |
| JP | 2016-004516 A | 1/2016 |

OTHER PUBLICATIONS

Office Action for JP Patent Application No. 2018-514252, dated Apr. 6, 2021, 5 pages of Office Action and 5 pages of English Translation.

* cited by examiner

12(100B)

ELECTRONIC EQUIPMENT, POWER SUPPLY METHOD OF ELECTRONIC EQUIPMENT, POWER RECEPTION METHOD OF ELECTRONIC EQUIPMENT, AND INTERFACE CABLE

CROSS REFERENCE TO RELATED APPLICATIONS

This application is a U.S. National Phase of International Patent Application No. PCT/JP2017/014914 filed on Apr. 12, 2017, which claims priority benefit of Japanese Patent Application No. JP 2016-088954 filed in the Japan Patent Office on Apr. 27, 2016. Each of the above-referenced applications is hereby incorporated herein by reference in its entirety.

TECHNICAL FIELD

The present technology relates to electronic equipment, a power supply method of electronic equipment, a power reception method of electronic equipment, and an interface cable, and particularly to electronic equipment and so on capable of supplying power to external equipment.

BACKGROUND ART

Supply of power between pieces of equipment connected by an interface cable involves problems in the case of a current flow higher than anticipated through the interface cable including incapability to supply sufficient power to connection destination equipment and increased heating of the interface cable due to a larger-than-anticipated voltage drop.

In order to avoid such problems, a mechanism is employed that permits connected equipment to identify the current level that is allowed to flow through the interface cable. For example, a mechanism is known in which plugs have identification information as in 'Electronic Markers' of "USB Power Delivery." Large power is supplied to connection destination equipment in the case where a cable supporting a large current is connected. Otherwise, it is possible to perform control, for example, such that small power is supplied to connection destination equipment.

It is common to implement an interface cable identification mechanism by embedding a circuit or chip in the plugs. However, this entails problems such as increased plug size and higher interface cable cost. For example, PTL 1 describes a technology for identifying information specific to a core of the interface cable by including a resistor and a diode in the plug.

CITATION LIST

Patent Literature

[PTL 1]
Japanese Patent Laid-Open No. 1994-223922

SUMMARY

Technical Problem

It is an object of the present technology to achieve excellent supply of power to connection destination equipment.

Solution to Problem

A concept of the present technology lies in electronic equipment that includes a receptacle having a plurality of electric terminal sets. The electric terminal sets each include a first electric terminal for power, a second electric terminal for detection, and a third electric terminal for grounding. The electronic equipment further includes a cable identification section and a power supply section. The cable identification section identifies a configuration of an interface cable connected to the receptacle on the basis of signals acquired from the second electric terminals of the plurality of electric terminal sets. The power supply section supplies power to external equipment through the first electric terminals of some or all of the plurality of electric terminal sets in accordance with the identified cable configuration.

In the present technology, the electronic equipment includes a receptacle having a plurality of electric terminal sets. Here, the electric terminal sets each include a first electric terminal for power, a second electric terminal for detection, and a third electric terminal for grounding. The configuration of the interface cable connected to the receptacle is identified by the cable identification section on the basis of signals acquired from the second electric terminals of the plurality of electric terminal sets. Power is supplied by the power supply section to external equipment through the first electric terminals of some or all of the plurality of electric terminal sets in accordance with the identified cable configuration.

Thus, in the present technology, the configuration of the interface cable connected to the receptacle is identified on the basis of signals acquired from the second electric terminals of the plurality of electric terminal sets, and power is supplied to external equipment through the first electric terminals of some or all of the plurality of electric terminal sets in accordance with an identification result thereof. For this reason, it is possible to achieve excellent supply of power to external equipment as connection destination equipment in accordance with the configuration of the interface cable.

It should be noted, in the present technology, for example, that the receptacle may have an electric terminal set provided on each of two opposing faces of an opening section having an opening face of a given shape such that the first to third electric terminals are lined up point-symmetrically. Thus, lining up the first to third electric terminals point-symmetrically allows for reversible connection of the interface cable that includes a plug having an electric terminal set.

Also, in the present technology, for example, the receptacle may further have a connection section for communication with external equipment, and the electronic equipment may further include a power feed level determination section that determines supplied power on the basis of required power information received from the external equipment through the connection section and the identified cable configuration. The power supply section may supply the determined supplied power to the external equipment. This makes it possible to properly supply power to the external equipment as connection destination equipment.

Another concept of the present technology lies in electronic equipment that includes a receptacle having a plurality of electric terminal sets. The electric terminal sets each include a first electric terminal for power, a second electric terminal for detection, and a third electric terminal for grounding. The electronic equipment further includes a current output section and a power reception section. The current output section outputs a current to the first electric terminals of the plurality of electric terminal sets. The power reception section receives power supplied from external equipment at the second electric terminals of some or all of the plurality of electric terminal sets through a cable connected to the receptacle.

In the present technology, the electronic equipment includes a receptacle having a plurality of electric terminal sets. Here, the electric terminal sets each include a first electric terminal for power, a second electric terminal for detection, and a third electric terminal for grounding. A current is output by the current output section to the second electric terminals of the plurality of electric terminal sets. Power, supplied from external equipment, is received by the power reception section at the first electric terminals of some or all of the plurality of electric terminal sets through an interface cable connected to the receptacle.

Thus, in the present technology, a current is supplied to the second electric terminals of the plurality of electric terminal sets. For this reason, external equipment as connection destination equipment can readily identify the interface cable configuration, allowing for excellent reception of power through the interface cable.

It should be noted that, in the present technology, for example, the receptacle may have an electric terminal set provided on each of two opposing faces of an opening section having an opening face of a given shape such that the first to third electric terminals are lined up point-symmetrically. Thus, lining up the first to third electric terminals point-symmetrically allows for so-called reversible connection in which the interface cable plugs are connected upside down.

Also, in the present technology, for example, the receptacle may further have a connection section for communication with external equipment, and the electronic equipment may further include a communication section that sends required power information to external equipment through this connection section. In this case, for example, the electronic equipment may further include a battery and a power reception level determination section. The battery stores power received by the power reception section. The power reception level determination section determines required power on the basis of a charge level of the battery. The communication section may send information regarding the determined required power to the external equipment. Thus, sending required power information to the external equipment makes it possible for the external connection destination equipment to properly determine supplied power, allowing for excellent reception of power through the interface cable.

Also, another concept of the present technology lies in an interface cable that includes a plug having one or a plurality of electric terminal sets. The electric terminal set includes three or first to third electric terminals.

In the present technology, the interface cable includes a plug having one or a plurality of electric terminal sets. Here, the electric terminal set includes a first electric terminal for power, a second electric terminal for detection, and a third electric terminal for grounding.

For example, the plug may have an insertion section that is to be inserted into an opening section of a receptacle of electronic equipment having an opening face of a given shape and that has an insertion face of a corresponding shape, and the electric terminal set may be provided on a face of the insertion section corresponding to one of faces of the opening section. Also, for example, the plug may have an insertion section that is to be inserted into an opening section of a receptacle of electronic equipment having an opening face of a given shape and that has an insertion face of a corresponding shape, and the electric terminal set may be provided on each of two faces of the insertion section corresponding to two opposing faces of the opening section.

Thus, in the present technology, the plug has one or a plurality of electric terminal sets, and each of the electric terminal sets includes first to third electric terminals. This makes it possible to readily identify the interface cable configuration.

Advantageous Effect of Invention

According to the present technology, it is possible to achieve excellent supply of power to connection destination equipment. Effects described in the present specification are merely illustrative, and there may be additional effects.

DESCRIPTION OF EMBODIMENT

A description will be given below of a mode for carrying out the invention (hereinafter referred to as an "embodiment"). It should be noted that the description will be given in the following order:
1. Embodiment
2. Modification example

1. Embodiment

[Configuration of the AV Transport System]

Figure 1:
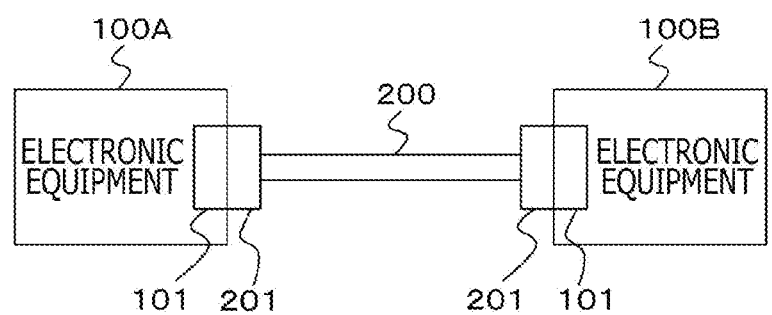
FIG. 1 is a block diagram illustrating a configuration of an AV transport system as an embodiment.

FIG. 1 illustrates a configuration of an AV (Audio and Visual) transport system 10 as an embodiment. This AV transport system 10 includes transmitting side electronic equipment 100A, receiving side electronic equipment 100B, and an interface cable 200 that connects these pieces of electronic equipment. A plug 201 at one end of the interface cable 200 is connected to a receptacle 101 of the electronic equipment 100A, and a plug 201 at other end of the interface cable 200 is connected to a receptacle 101 of the electronic equipment 100B.

Video data, audio data, and other media data can be sent from the electronic equipment 100A to the electronic equipment 100B via the interface cable 200. Also, various pieces of information can be communicated between the electronic equipment 100A and the electronic equipment 100B via the interface cable 200. Also, power can be supplied from one of the electronic equipment 100A and the electronic equipment 100B to the other, and in the present embodiment, from the electronic equipment 100A to the electronic equipment 100B via the interface cable 200.

Figure 2:
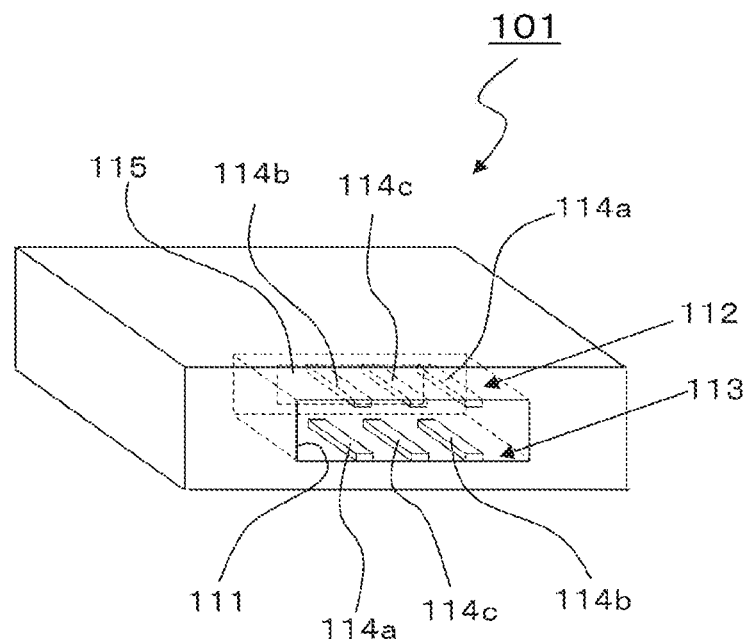
FIG. 2 is a diagram schematically illustrating an example of a receptacle structure of electronic equipment.

FIG. 2 schematically illustrates an example of a structure of the receptacle 101 of the electronic equipment 100A and the electronic equipment 100B. The receptacle 101 has an opening section 111 having an opening face of a given shape for insertion of an insertion section of the plug 201, and in the present embodiment, the opening section 111 has a rectangular opening face. Electric terminal sets 112 and 113 are provided respectively on two opposing faces of this opening section 111, and in the example illustrated, the electric terminal sets 112 and 113 are provided respectively on upper and lower faces. It should be noted that various shapes such as ellipse and rounded rectangle are possible as a given shape in addition to rectangle.

Each of the electric terminal sets 112 and 113 includes a first electric terminal 114a for power, a second electric terminal 114b for detection, and a third electric terminal 114c for grounding. Here, in the electric terminal sets 112 and 113 provided respectively on the upper and lower faces of the opening section 111, the first to third electric terminals are lined up point-symmetrically. Thus, lining up the first to third electric terminals point-symmetrically allows for so-called reversible connection in which the plugs of the interface cable 200 are connected upside down.

A connection section 115 for communication is provided on a bottom face side of the opening section 111. This connection section 115 is optically or electrically connected to a connection section for communication provided on the plug 201 of the interface cable 200. In the case of optical connection, a communication channel of the interface cable 200 includes an optical communication channel using, for example, optical fibers. On the other hand, in the case of electrical connection, the communication channel of the interface cable 200 includes an electric communication channel using, for example, coaxial lines.

Figure 3:
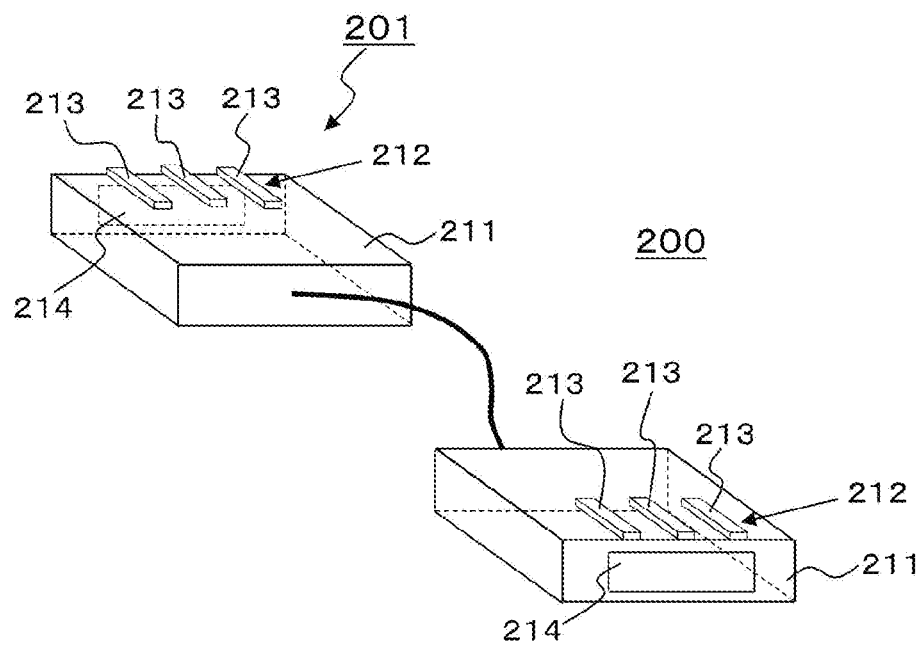
FIG. 3 is a diagram schematically illustrating an example of a plug structure of an interface cable ("configuration 1").

FIG. 3 schematically illustrates an example of a structure of the plug 201 of the interface cable 200. This structure example is an example of "configuration 1" in which an electric terminal set is provided in the plug 201. The plug 201 has an insertion section 211 of a corresponding shape to be inserted into the opening section 111 of the receptacle 101 of the electronic equipment 100A or 100B, and has, in the present embodiment, the insertion section 211 having a rectangular insertion face. An electric terminal set 212 is provided on a face of the insertion section 211 corresponding to one of the faces of the opening section 111.

The electric terminal set 212 includes three or first, second, and third electric terminals 213. Here, the first electric terminal 213 is an electric terminal to be connected to the electric terminal 114a of the receptacle 101, the second electric terminal 213 is an electric terminal to be connected to the electric terminal 114b of the receptacle 101, and the third electric terminal 213 is an electric terminal to be connected to the electric terminal 114c of the receptacle 101.

Also, a connection section 214 for communication is provided on the side of the face, of the insertion section 211, corresponding to the bottom face of the opening section 111. This connection section 214 is optically or electrically connected to the connection section 115 for communication provided on the receptacle 101 of the electronic equipment 100A or 100B. In the case of optical connection, the communication channel of the interface cable 200 includes an optical communication channel using, for example, optical fibers. On the other hand, in the case of electrical connection, the communication channel of the interface cable 200 includes an electric communication channel using, for example, coaxial lines.

Figure 4:
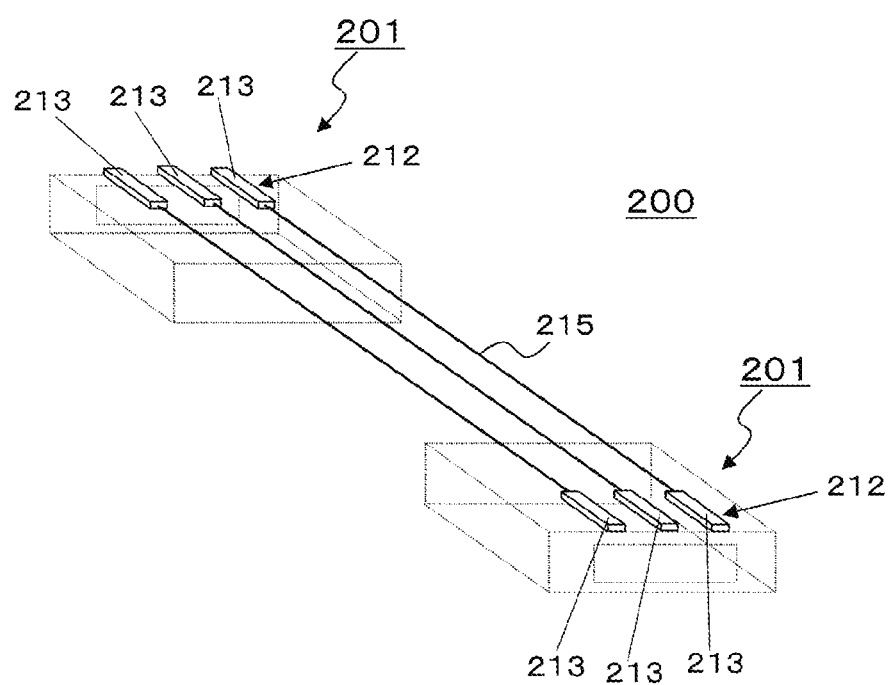
FIG. 4 is a diagram for describing connection between electric terminal sets of plugs at two ends of the interface cable ("configuration 1").

In the structure example illustrated in FIG. 3, the three electric terminals 213 of the electric terminal set 212 of the plug 201 at one end of the interface cable 200 and the three electric terminals 213 of the electric terminal set 212 of the plug 201 at the other end are electrically connected by three metal wires 215 included in the cable as illustrated in FIG. 4.

Figure 5:
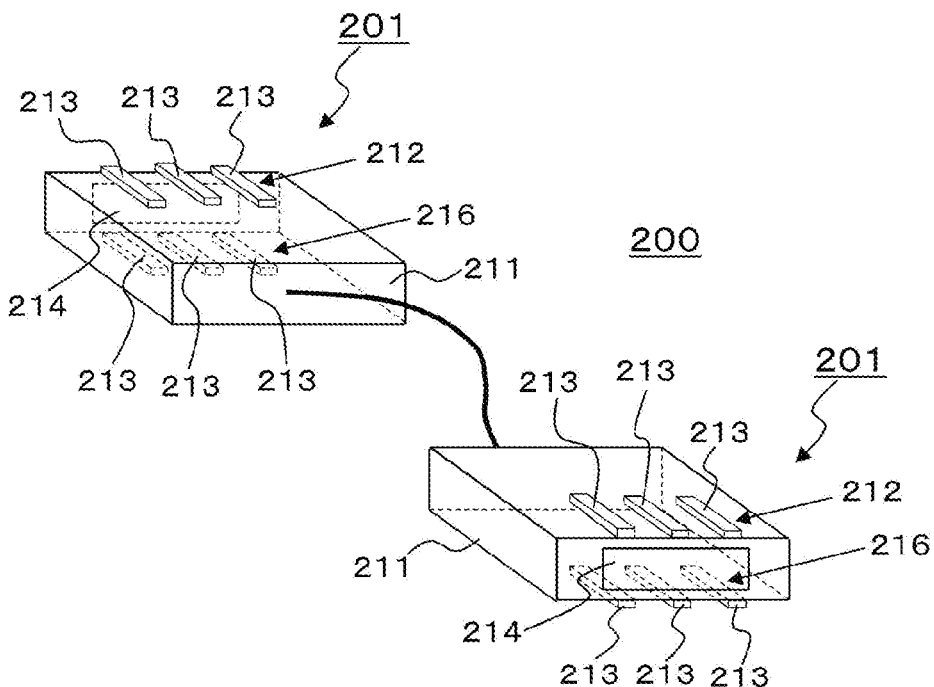
FIG. 5 is a diagram schematically illustrating an example of a plug structure of the interface cable ("configuration 2").

FIG. 5 schematically illustrates another example of a structure of the plug 201 of the interface cable 200. This structure example is an example of "configuration 2" in which two electric terminal sets are provided in the plug 201. The plug 201 has the rectangular insertion section 211 to be inserted into the opening section 111 of the receptacle 101 of the electronic equipment 100A or 100B. The electric terminal set 212 and an electric terminal set 216 are provided on two faces of the insertion section 211 corresponding to the two opposing faces of the opening section 111.

Each of the electric terminal sets 212 and 216 includes the three or first, second, and third electric terminals 213. Here, the first electric terminal 213 is an electric terminal to be connected to the electric terminal 114a of the receptacle 101, the second electric terminal 213 is an electric terminal to be connected to the electric terminal 114b of the receptacle 101, and the third electric terminal 213 is an electric terminal to be connected to the electric terminal 114c of the receptacle 101.

Also, the connection section 214 for communication is provided on the side of the face, of the insertion section 211, corresponding to the bottom face of the opening section 111. This connection section 214 is optically or electrically connected to the connection section 115 for communication provided on the receptacle 101 of the electronic equipment 100A or 100B. In the case of optical connection, the communication channel of the interface cable 200 includes an optical communication channel using, for example, optical fibers. On the other hand, in the case of electrical connection, the communication channel of the interface cable 200 includes an electric communication channel using, for example, coaxial lines.

Figure 6:
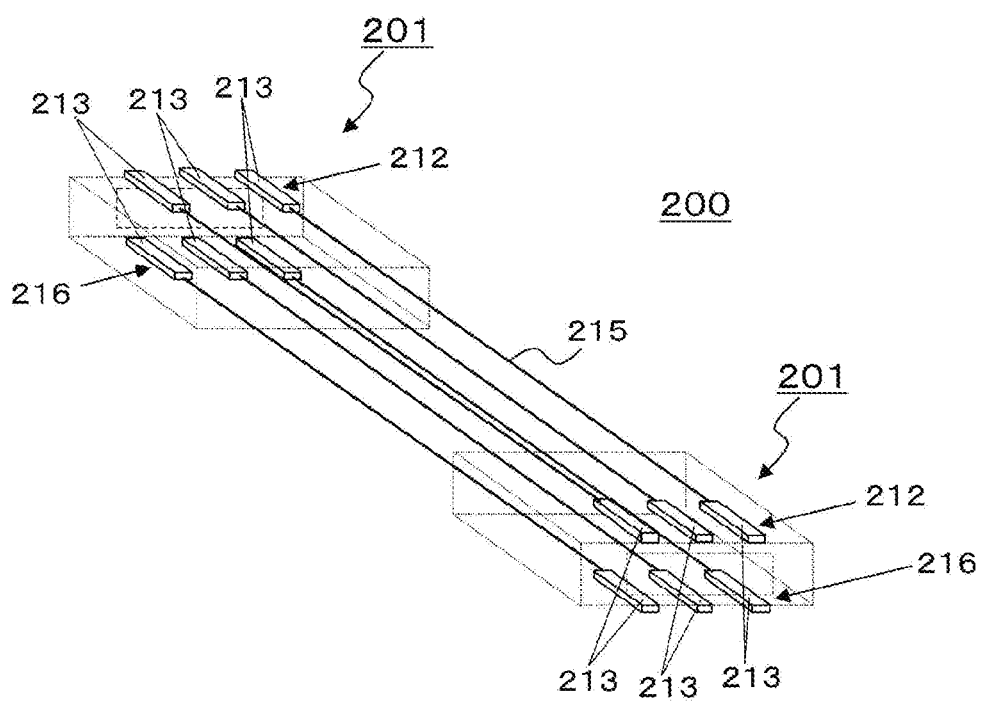
FIG. 6 is a diagram for describing connection between the electric terminal sets of the plugs at the two ends of the interface cable ("configuration 2").

In the structure example illustrated in FIG. 5, the three electric terminals 213 of the electric terminal set 212 and those of the electric terminal set 216 of the plug 201 at one end of the interface cable 200 and the three electric terminals 213 of the electric terminal set 212 and those of the electric terminal set 216 of the plug 201 at the other end are electrically connected by six metal wires 215 included in the cable as illustrated in FIG. 6.

Figure 7:
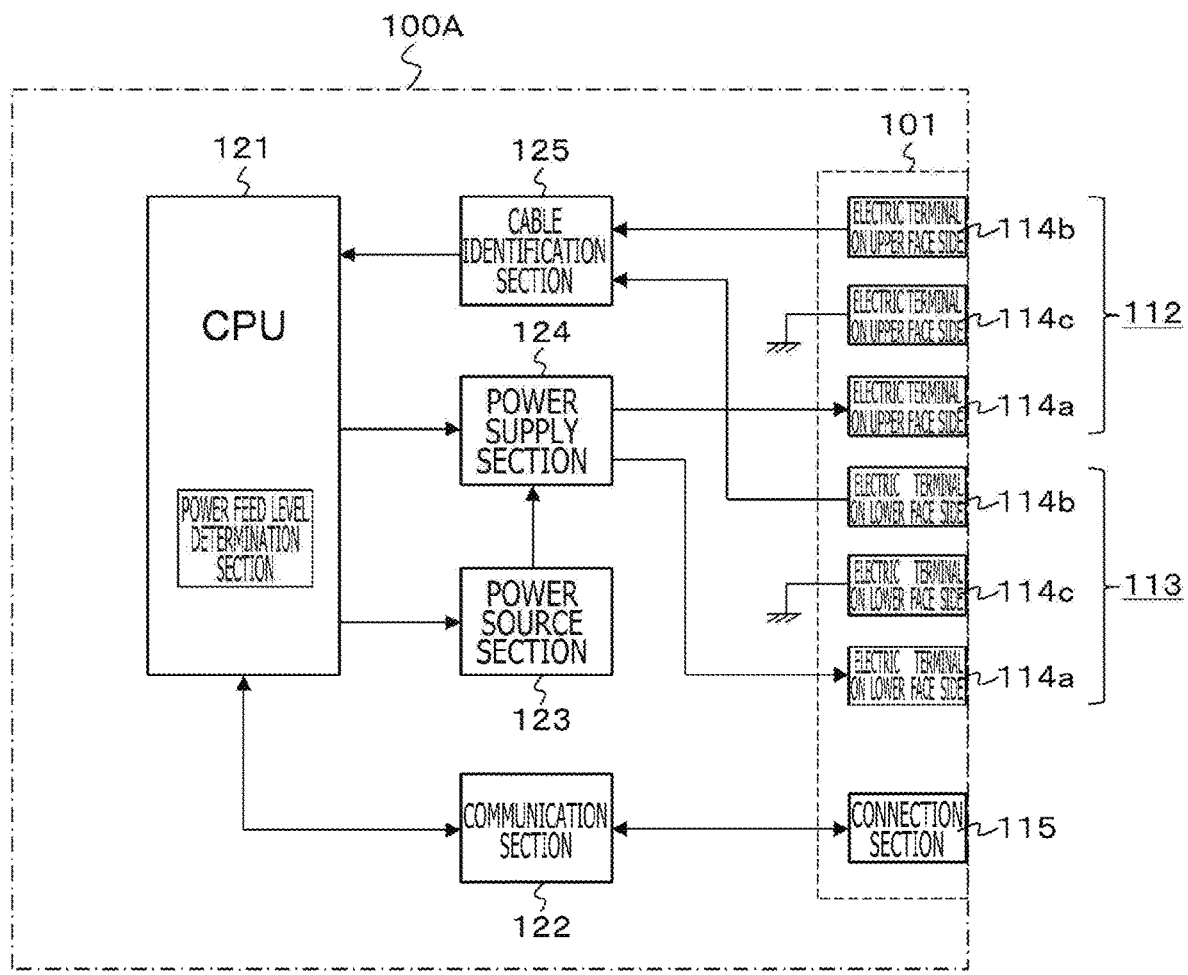
FIG. 7 is a block diagram illustrating a configuration example of electronic equipment (power feeding side).

FIG. 7 illustrates a configuration example of the electronic equipment 100A. The electronic equipment 100A has a CPU 121, a communication section 122, a power source section 123, a power supply section 124, and a cable identification section 125 in addition to the receptacle 101. The CPU 121 is included in a control section and controls the operation of respective sections of the electronic equipment 100A.

The communication section 122 communicates with the electronic equipment 100B as connection destination equipment (external equipment) through the connection section 115. In this case, the communication section 122 sends video data, audio data, and other media data to the electronic equipment 100B. Also, the communication section 122 communicates various pieces of information with the electronic equipment 100B. In this case, the communication section 122 sends information generated by the CPU 121 to the electronic equipment 100B and supplies information received from the electronic equipment 100B to the CPU 121. This information received from the electronic equipment 100B includes power feed request information, required power information, and other information.

The cable identification section 125 identifies whether or not the interface cable 200 is connected to the receptacle 101 on the basis of signals acquired from the second electric terminals 114b of the electric terminal sets 112 and 113 provided on the receptacle 101, and further, in the case where the interface cable 200 is connected, identifies the configuration of the interface cable 200, and sends the results thereof to the CPU 121.

In this case, when the interface cable 200 is not connected to the receptacle 101, no current is detected from both the electric terminal 114b of the electric terminal set 112 and the electric terminal 114b of the electric terminal set 113, thereby making it possible to identify that the interface cable 200 is not connected.

Also, in this case, when the "configuration 1 (refer to FIG. 3)" interface cable 200 is connected to the receptacle 101, a current is detected from either the electric terminal 114b of the electric terminal set 112 or the electric terminal 114b of the electric terminal set 113, thereby making it possible to identify that the "configuration 1" interface cable 200 is connected and further identify to which electric terminal 114a, that of the electric terminal set 112 or that of the electric terminal set 113, power should be supplied.

Also, in this case, when the "configuration 2 (refer to FIG. 5)" interface cable 200 is connected to the receptacle 101, a current is detected from both the electric terminal 114b of the electric terminal set 112 and the electric terminal 114b of the electric terminal set 113, thereby making it possible to identify that the "configuration 2" interface cable 200 is connected and that power can be supplied from both of the electric terminals 114a of the electric terminal set 112 and the electric terminal set 113.

The power source section 123 is, for example, an AC power source and supplies power to respective sections of the electronic equipment 100A. The power supply section 124 supplies power to the electronic equipment 100B by applying, under control of the CPU 121, a given voltage and current to either one of or both the electric terminal 114a of the electric terminal set 112 and the electric terminal 114a of the electric terminal set 113.

Here, the CPU 121 supplies power to the electronic equipment 100B in response to a power feed request from the electronic equipment 100B. Also, the CPU 121 determines supplied power on the basis of the configuration of the interface cable 200 connected to the receptacle 101 and required power information sent from the electronic equipment 100B and controls the power supply section 124 such that the power is supplied to the electronic equipment 100B. In this sense, the CPU 121 configures the power feed level determination section. It should be noted that details of a power feeding process handled by the CPU 121 will be further described later.

Figure 8:
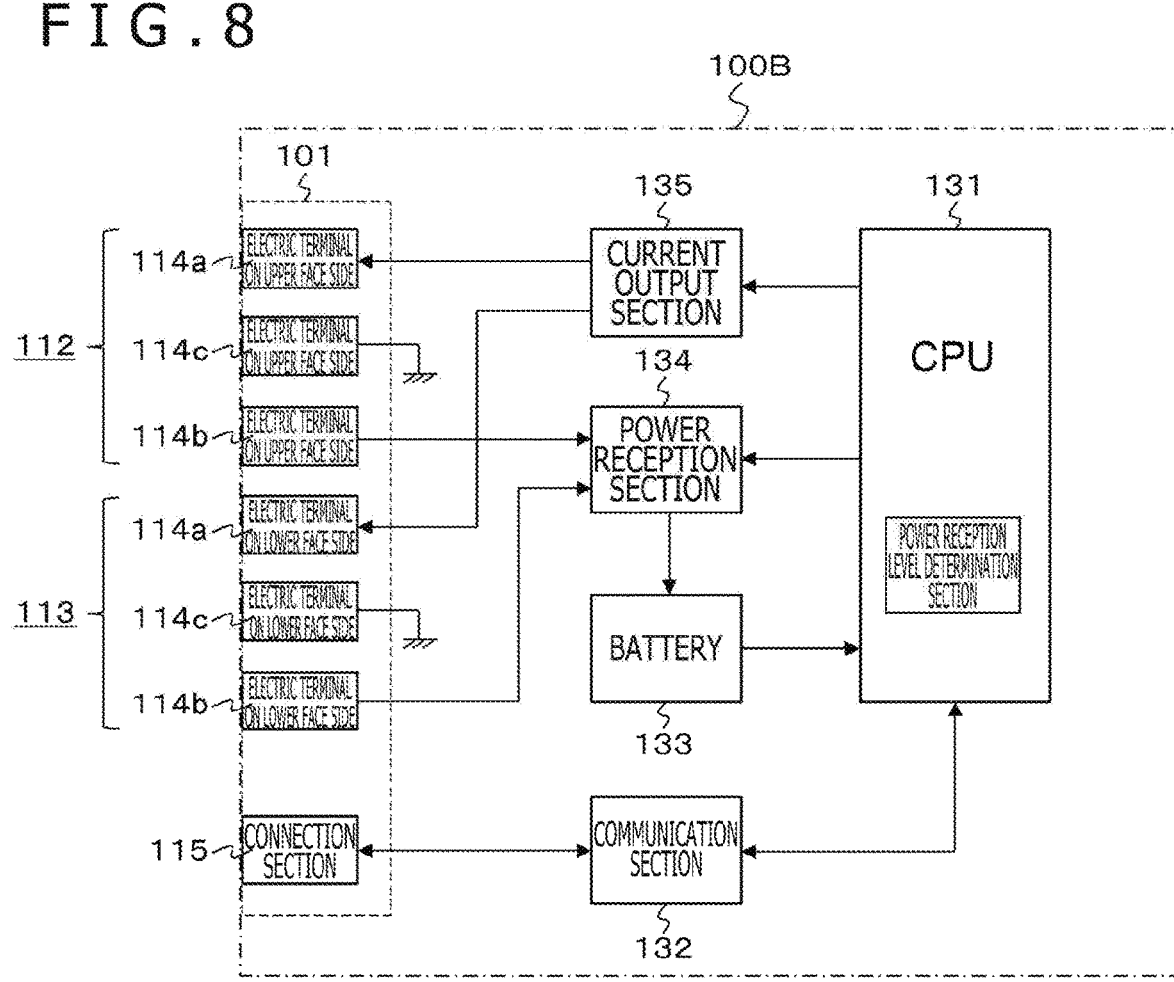
FIG. 8 is a block diagram illustrating a configuration example of electronic equipment (power receiving side).

FIG. 8 illustrates a configuration example of the electronic equipment 100B. The electronic equipment 100B has a CPU 131, a communication section 132, a battery 133, a power reception section 134, and a current output section 135 in addition to the receptacle 101. The CPU 131 is included in a control section and controls the operation of respective sections of the electronic equipment 100B in accordance with a control program.

The communication section 132 communicates with the electronic equipment 100A as connection destination equipment (external equipment) through the connection section 115. In this case, the communication section 132 receives video data, audio data, and other media data from the electronic equipment 100A. Also, the communication section 132 communicates various pieces of information with the electronic equipment 100A. In this case, the communication section 132 sends information generated by the CPU 131 to the electronic equipment 100A and supplies information received from the electronic equipment 100A to the CPU 131. This information sent to the electronic equipment 100A includes power feed request information, required power information, and other information.

The current output section 135 outputs a current to the second electric terminals 114a of the electric terminal sets 112 and 113 provided on the receptacle 101. As a result, the cable identification section 125 of the electronic equipment 100A can identify whether or not the interface cable 200 is connected to the receptacle 101 and further identify the configuration of the interface cable 200 in the case where the interface cable 200 is connected as described above.

The battery 133 supplies power to respective sections of the electronic equipment 100B. The CPU 131 checks the charge level of this battery 133 and, in the case where the CPU 131 decides that power needs to be received due to insufficient charge, determines required power, i.e., power to be supplied from the electronic equipment 100A, and sends power feed request information and required power information to the electronic equipment 100A from the communication section 132. In this sense, the CPU 131 configures the power feed level determination section.

The power reception section 134 takes in the product of voltage and current, i.e., power acquired at either one of or both the electric terminal 114b of the electric terminal set 112 and the electric terminal 114b of the electric terminal set 113, thereby charging the battery 133. The CPU 131 sends power-feed-not-required information to the electronic equipment 100A from the communication section 132 when the battery 133 is sufficiently charged, when the electronic equipment 100B is connected to an undepicted external power source, or at other timing.

Figure 9:
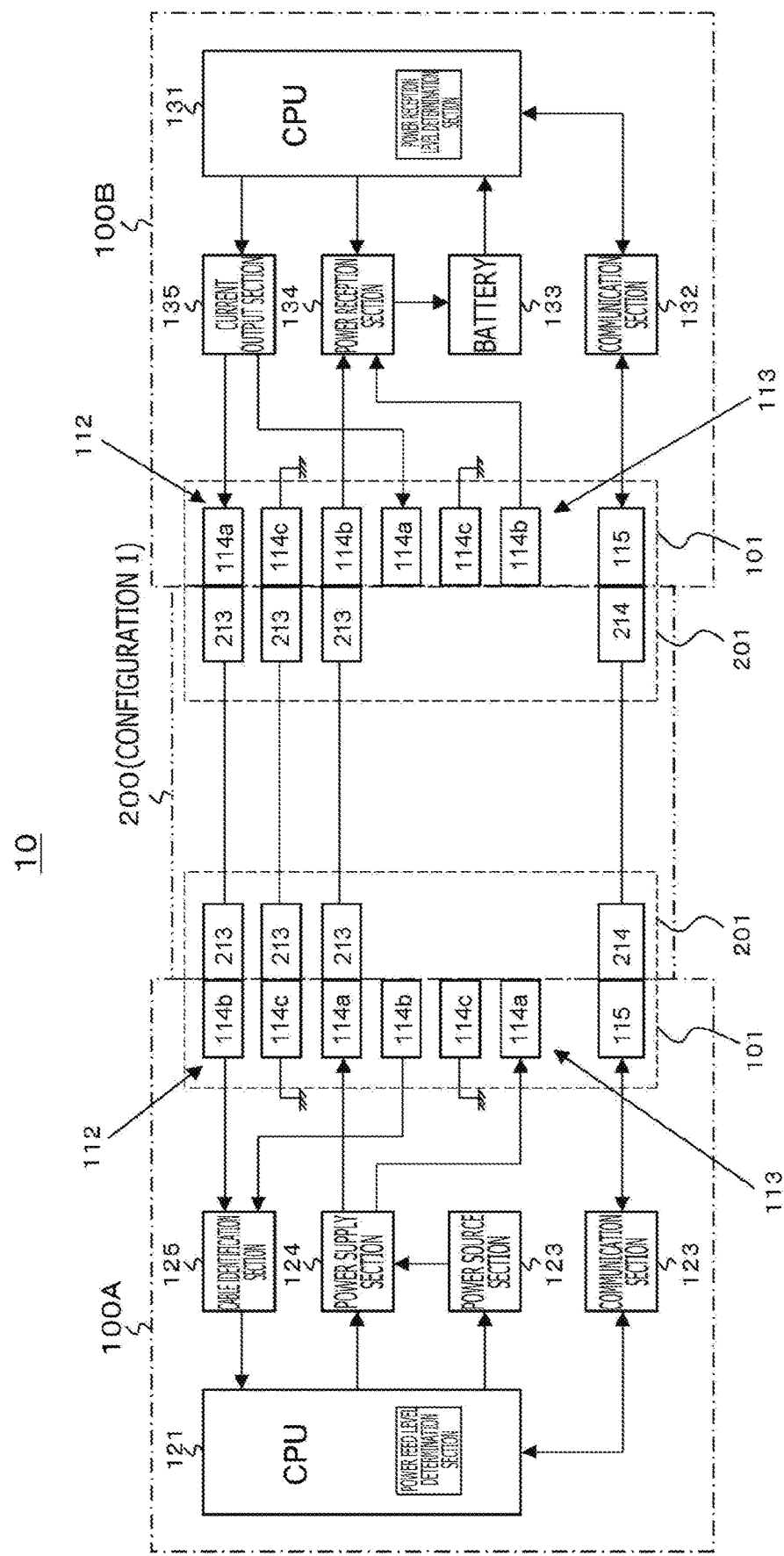
FIG. 9 is a diagram illustrating a state in which the electronic equipment on the power feeding side and the electronic equipment on the power receiving side are connected by the "configuration 1" interface cable.

FIG. 9 illustrates a state in which the electronic equipment 100A and the electronic equipment 100B are connected by the "configuration 1 (refer to FIG. 3)" interface cable 200. In the example illustrated, the electric terminal set 112 of the electronic equipment 100A is connected to the electric terminal set 112 of the electronic equipment 100B. However, the case where the electric terminal set 112 of the electronic equipment 100A is connected to the electric terminal set 113 of the electronic equipment 100B, the case where the electric terminal set 113 of the electronic equipment 100A is connected to the electric terminal set 112 of the electronic equipment 100B, and the case where the electric terminal set 113 of the electronic equipment 100A is connected to the electric terminal set 113 of the electronic equipment 100B, and other cases are also possible depending on the manner in which the plug 201 is inserted into the receptacle 101.

Figure 10:
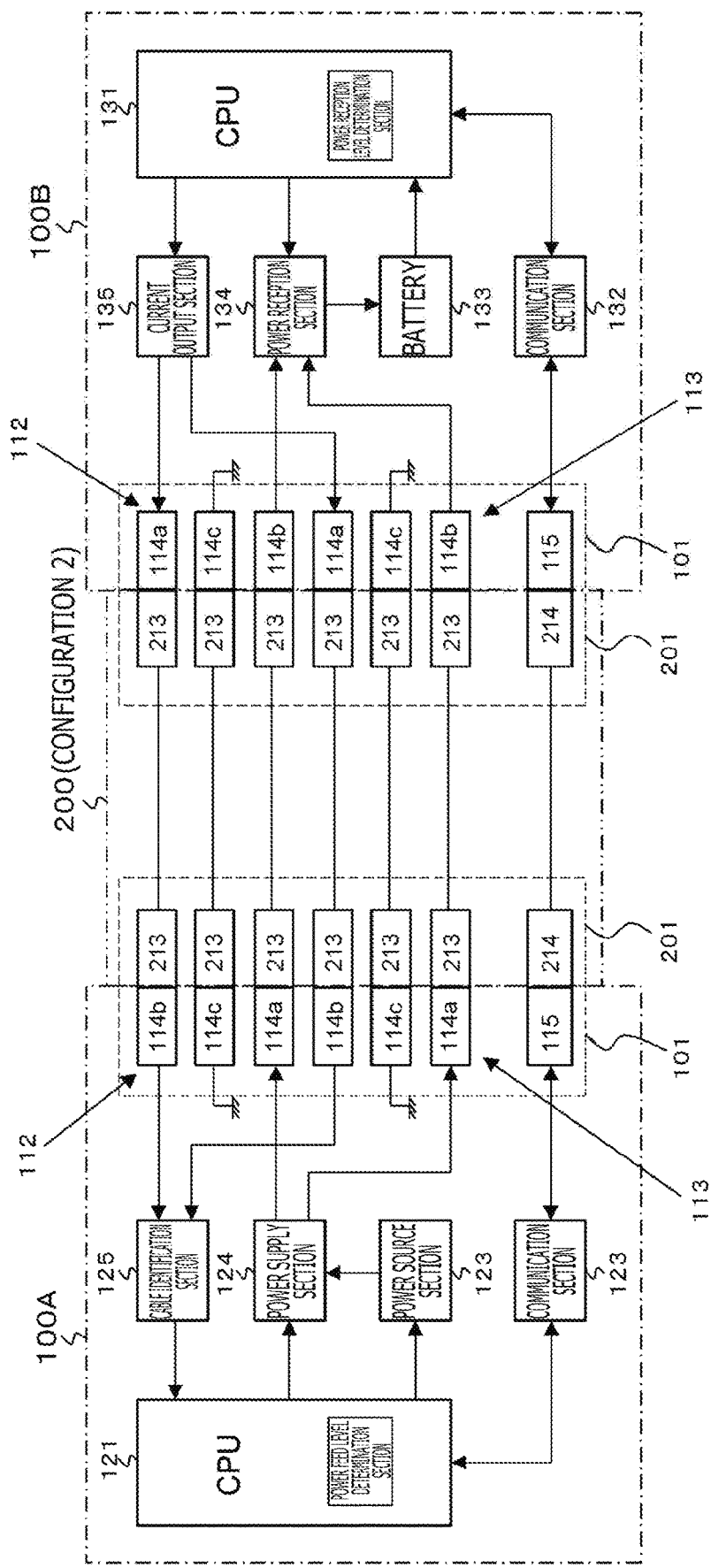
FIG. 10 is a diagram illustrating a state in which the two pieces of electronic equipment are connected by the "configuration 2" interface cable.

FIG. 10 illustrates a state in which the electronic equipment 100A and the electronic equipment 100B are connected by the "configuration 2 (refer to FIG. 5)" interface cable 200. In the example illustrated, the electric terminal sets 112 and 113 of the electronic equipment 100A are connected to the electric terminal sets 112 and 113 of the electronic equipment 100B. However, the case where the electric terminal sets 112 and 113 of the electronic equipment 100A are connected to the electric terminal sets 113 and 112 of the electronic equipment 100B is also possible depending on the manner in which the plug 201 is inserted into the receptacle 101. In the state illustrated in FIG. 10, twice as much power as in the state illustrated in FIG. 9 can be supplied from the electronic equipment 100A to the electronic equipment 100B.

"Power Feeding Process in the CPU"

A detailed description will be given of a power feeding process in the CPU 121 of the electronic equipment 100A (refer to FIG. 7).

Figure 11:
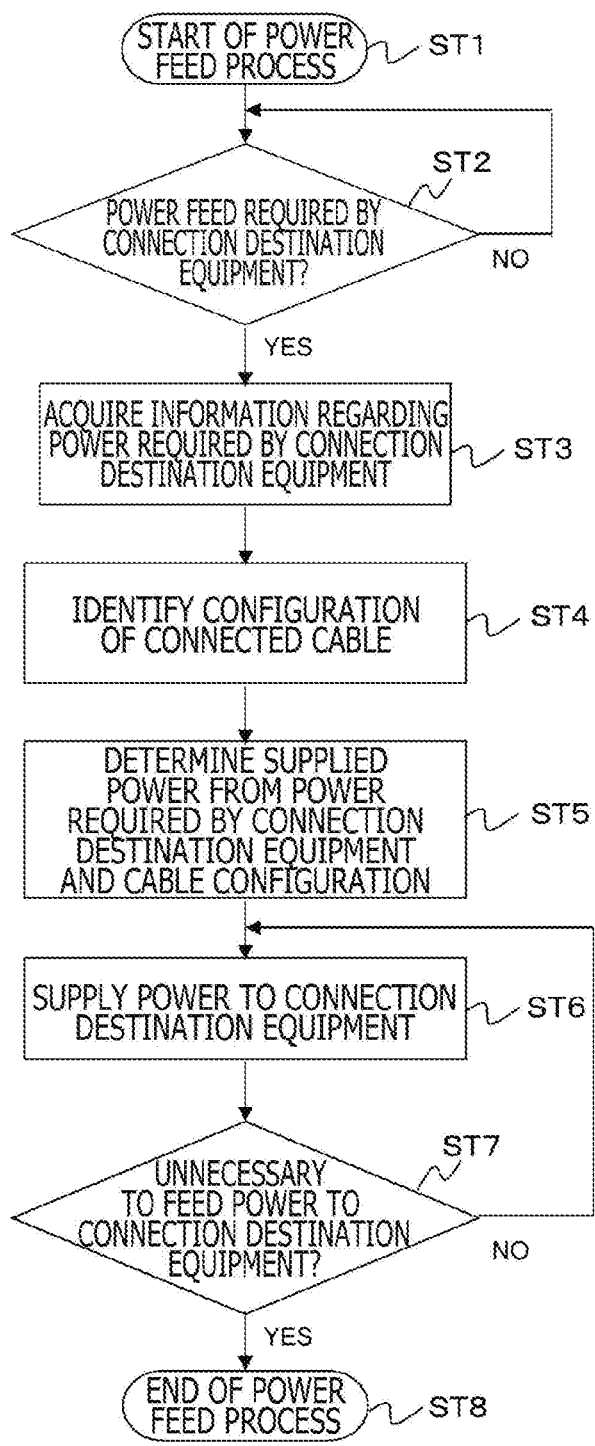
FIG. 11 is a flowchart illustrating an example of a procedure for a power feeding process in a CPU.

The flowchart in FIG. 11 illustrates an example of a procedure for the power feeding process in the CPU 121. The CPU 121 initiates the power feeding process in step ST1. Thereafter, the CPU 121 decides in step ST2 whether the electronic equipment 100B, connection destination equipment (external equipment), needs power feed. For example, the CPU 121 decides that the electronic equipment 100B needs power feed when the communication section 123 receives power feed request information from the electronic equipment 100B.

When deciding in step ST2 that the electronic equipment 100B needs power feed, the CPU 121 goes on to the process in step ST3. The CPU 121 acquires, in step ST3, information regarding power required by the electronic equipment 100B, connection destination equipment (external equipment). In this case, the CPU 121 acquires required power information from the electronic equipment 100B through the communication section 122.

Next, the CPU 121 identifies, in step ST4, the configuration of the connected interface cable 200. In this case, the CPU 12 identifies whether the configuration of the connected interface cable 200 is "configuration 1 (refer to FIG. 3)" or "configuration 2 (refer to FIG. 5)" on the basis of the identification result of the cable identification section 125.

Next, the CPU 121 determines, in step ST5, supplied power from power required by the electronic equipment 100B, connection destination equipment (external equipment), and the configuration of the interface cable 200.

Figure 12:
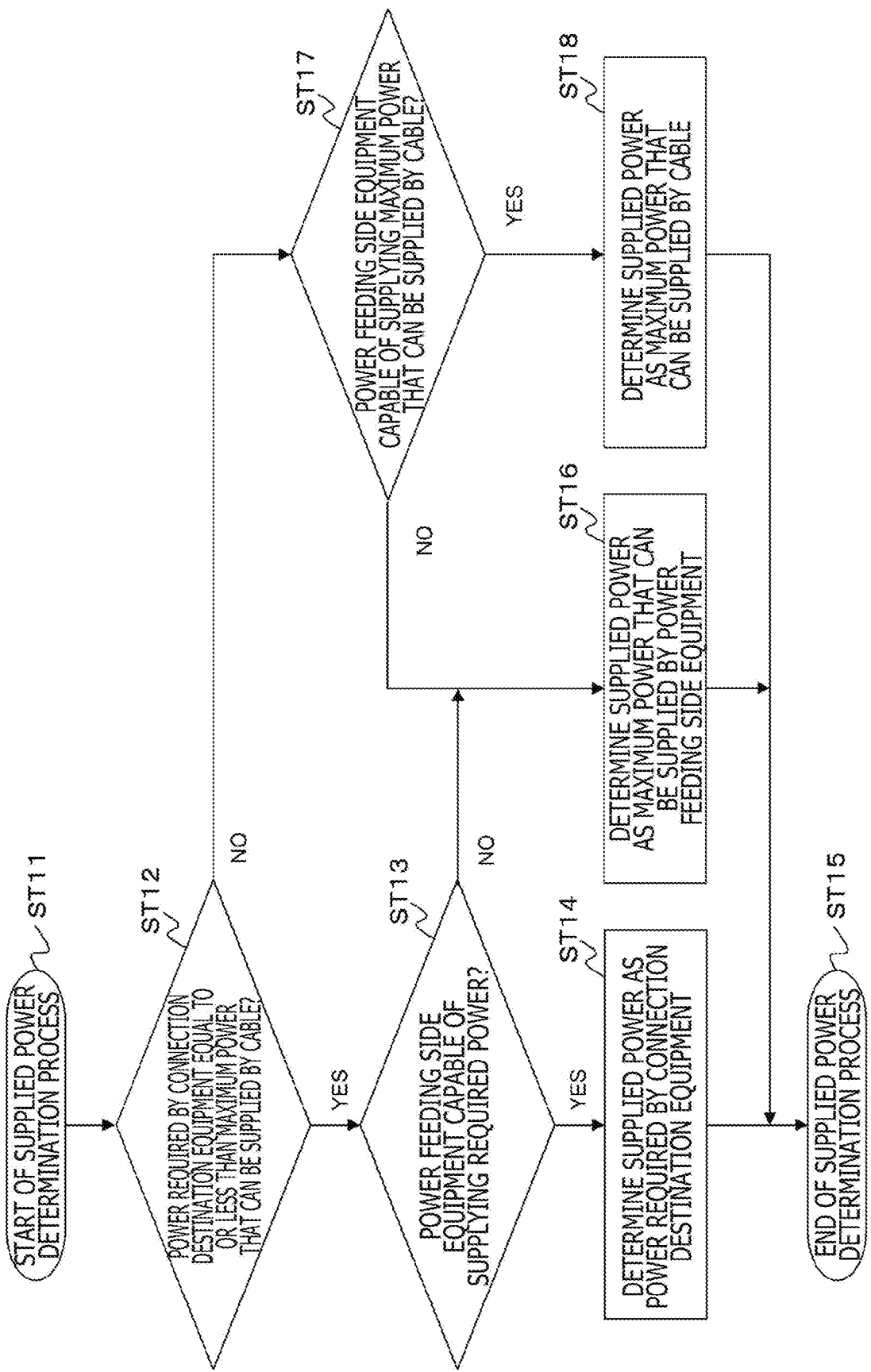
FIG. 12 is a flowchart illustrating an example of a procedure for supplied power determination process in the CPU.

The flowchart in FIG. 12 illustrates an example of a procedure for supplied power determination process in the CPU 121. The CPU 121 initiates the supplied power determination process in step ST11. Thereafter, the CPU 121 decides in step ST12 whether or not power required by the electronic equipment 100B, connection destination equipment (external equipment), is equal to or less than maximum power that can be supplied by the interface cable 200. It should be noted that the CPU 121 knows, in advance, both maximum power that can be supplied by the "configuration 1" interface cable 200 and maximum power that can be supplied by the "configuration 2" interface cable 200.

When deciding that power required by the electronic equipment 100B is equal to or less than maximum power that can be supplied by the interface cable 200, the CPU 121 decides in step ST13 whether or not the electronic equipment 100A, equipment on a power feeding side, is capable of supplying power required by the electronic equipment 100B. When deciding that the electronic equipment 100A is capable of supplying required power, the CPU 121 determines, in step ST14, supplied power as power required by the electronic equipment 100B, connection destination equipment (external equipment). Thereafter, the CPU 121 terminates the supplied power determination process in step ST15.

Also, when deciding, in step ST13, that the electronic equipment 100A, equipment on the power feeding side, is not capable of supplying power required by the electronic equipment 100B, the CPU 121 determines, in step ST16, supplied power as maximum power that can be supplied by the electronic equipment 100A, equipment on the power feeding side. Thereafter, the CPU 121 terminates the supplied power determination process in step ST15.

Also, when deciding, in step ST12, that power required by the electronic equipment 100B is not equal to or less than maximum power that can be supplied by the interface cable 200, the CPU 121 goes on to the process in step ST17. In this step ST17, the CPU 121 decides whether or not the electronic equipment 100A, equipment on the power feeding side, is capable of supplying maximum power that can be supplied by the interface cable 200.

When deciding that the electronic equipment 100A is not capable of supplying power, the CPU 121 determines, in step ST16, supplied power as maximum power that can be supplied by the electronic equipment 100A, equipment on the power feeding side. Thereafter, the CPU 121 terminates the supplied power determination process in step ST15. On the other hand, when deciding that the electronic equipment 100A is capable of supplying power, the CPU 121 determines, in step ST18, supplied power as maximum power that can be supplied by the interface cable 200. Thereafter, the CPU 121 terminates the supplied power determination process in step ST15.

Referring back to FIG. 11, the CPU 121 goes on to the process in step ST6 after the process in step ST5. In this step ST6, the CPU 121 begins to supply power to the electronic equipment 100B, connection destination equipment (external equipment), from the power supply section 124. In this case, power is controlled such that it is equal to the supplied power determined in step ST6.

Next, the CPU 121 decides, in step ST7, whether or not it is no longer necessary to feed power to the electronic equipment 100B, connection destination equipment (external equipment). For example, when the communication section 123 receives power-feed-not-required information from the electronic equipment 100B, the CPU 121 decides that it is no longer necessary to feed power to the electronic equipment 100B. When deciding that it is no longer necessary to feed power to the electronic equipment 100B, the CPU 121 stops supplying power to the electronic equipment 100B and terminates the power feeding process in step ST18.

[Configuration Example of the Disc Player]

Figure 13:
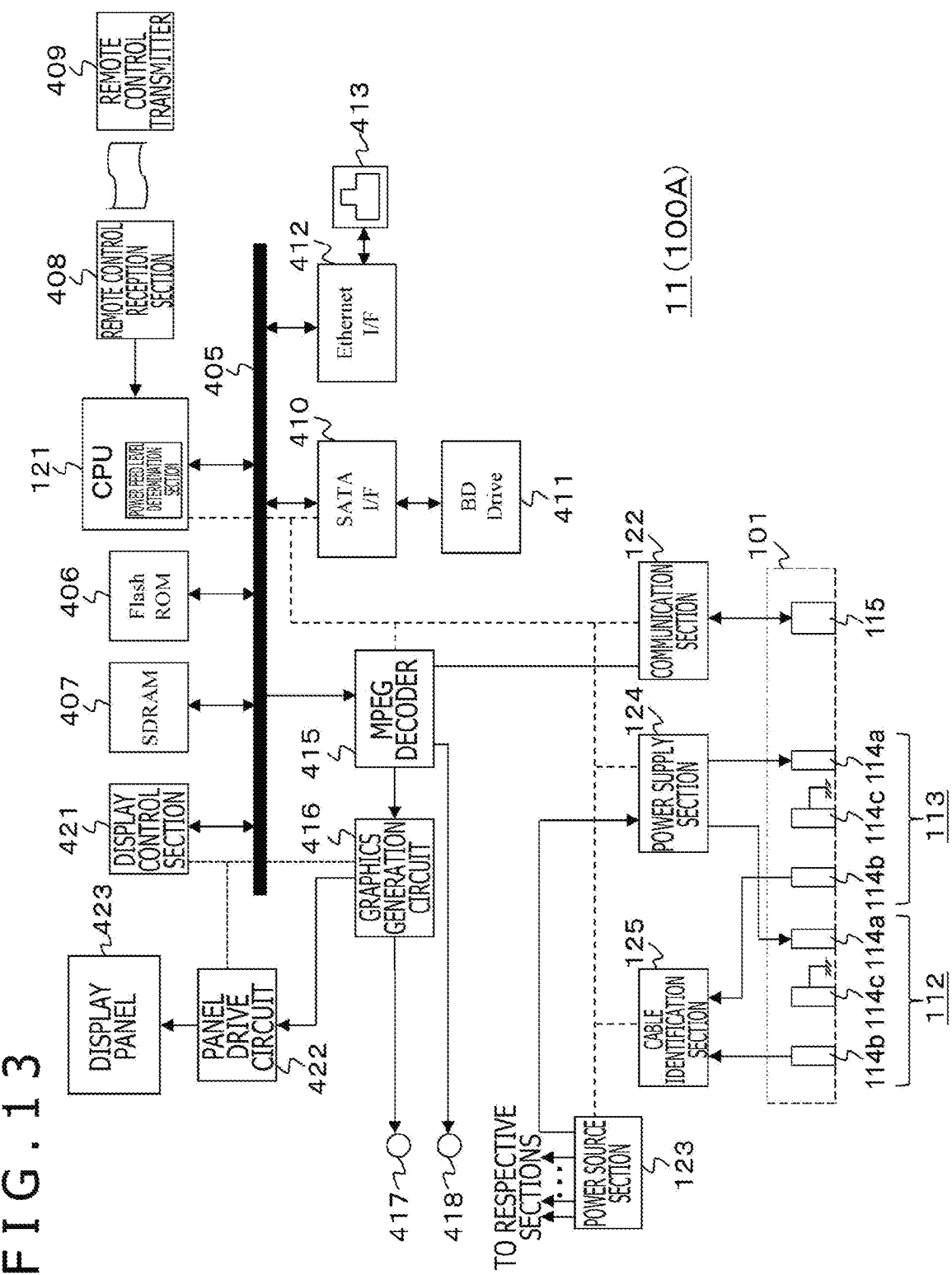
FIG. 13 is a block diagram illustrating a configuration example of a disc player as a specific example of electronic equipment (power feeding side).

FIG. 13 illustrates a configuration example of a disc player 11 as a specific example of the electronic equipment 100A. In this FIG. 13, components corresponding to those in FIG. 7 are denoted by the same reference signs, and detailed description thereof will be omitted as appropriate.

This disc player 11 has the receptacle 101, the communication section 122, the power source section 123, the power supply section 124, and the cable identification section 125. The plug 201 of the "configuration 1 (refer to FIG. 3)" or "configuration 2 (refer to FIG. 5)" interface cable 200 is connected to the receptacle 101. This disc player 11 is connected to external equipment, and, for example, to a portable image display apparatus 12 which will be described later through the interface cable 200.

Also, this disc player 11 has the CPU (Central Processing Unit) 121, an internal bus 405, a flash ROM (Read Only Memory) 406, an SDRAM (Synchronous Random Access Memory) 407, a remote control reception section 408, and a remote control transmitter 409.

Also, the disc player 11 has a SATA (Serial Advanced Technology Attachment) interface 410, a BD (Blu-Ray Disc) drive 411, an Ethernet interface (Ethernet I/F) 412, and a network terminal 413. Also, the disc player 11 has an MPEG (Moving Picture Expert Group) decoder 415, a graphics generation circuit 416, a video output terminal 417, and an audio output terminal 418.

Also, the disc player 11 has a display control section 421, a panel drive circuit 422, and a display panel 423. It should be noted that "Ethernet" is a registered trademark. The CPU 121, the flash ROM 406, the SDRAM 407, the SATA interface 410, the Ethernet I/F 412, the MPEG decoder 415, and the display control section 421 are connected to the internal bus 405.

The CPU 121 controls the operation of respective sections of the disc player 11. The flash ROM 406 stores control software and archives data. The SDRAM 407 configures a work area of the CPU 121. The CPU 121 loads software and data read from the flash ROM 406 into the SDRAM 407, activates the software, and controls the respective sections of the disc player 11.

The remote control reception section 408 receives a remote control signal (remote control code) sent from the remote control transmitter 409 and supplies the remote control code to the CPU 121. The CPU 121 controls the respective sections of the disc player 11 in accordance with the remote control code. It should be noted that although a remote control section is depicted as a user instruction input section in the illustrated example, the user instruction input section may be other component such as touch panel section that makes instruction input using switches, wheels, or through proximity or touch, a gesture input section that detects instruction input with a mouse, a keyboard, or a camera, or an audio input section that makes instruction input by voice.

The communication section 122 communicates with the external equipment through the connection section 115. In this case, the communication section 122 sends image (video) data, voice (audio) data, and other media data to the external equipment. Also, the communication section 122 communicates various pieces of information with the external equipment. In this case, the communication section 122 sends information generated by the CPU 121 to the external equipment and supplies information received from the external equipment to the CPU 121. Information received from the external equipment includes power feed request information, required power information, and other information.

The cable identification section 125 identifies whether or not the interface cable 200 is connected to the receptacle 101 on the basis of signals acquired from the second electric terminals 114b of the electric terminal sets 112 and 113 provided on the receptacle 101, and, in the case where the interface cable 200 is connected, further identifies the configuration of the interface cable 200, and sends the results thereof to the CPU 121.

In this case, when the interface cable 200 is not connected to the receptacle 101, no current is detected from both the electric terminal 114b of the electric terminal set 112 and the electric terminal 114 of the electric terminal set 113, thereby making it possible to identify that the interface cable 200 is not connected.

Also, in this case, when the "configuration 1 (refer to FIG. 3)" interface cable 200 is connected to the receptacle 101, a current is detected from either the electric terminal 114b of the electric terminal set 112 or the electric terminal 114b of the electric terminal set 113, thereby making it possible to identify that the "configuration 1" interface cable 200 is connected and further identify to which electric terminal 114a, that of the electric terminal set 112 or that of the electric terminal set 113, power should be supplied.

Also, in this case, when the "configuration 2 (refer to FIG. 5)" interface cable 200 is connected to the receptacle 101, a current is detected from both the electric terminal 114b of the electric terminal set 112 and the electric terminal 114 of the electric terminal set 113, thereby making it possible to identify that the "configuration 2" interface cable 200 is connected and that power can be supplied from both of the electric terminals 114a of the electric terminal set 112 and the electric terminal set 113.

The power source section 123 is, for example, an AC power source and supplies power to respective sections of the disc player 11. The power supply section 124 supplies power to the external equipment by applying, under control of the CPU 121, a given voltage and current to either one of or both the electric terminal 114a of the electric terminal set 112 and the electric terminal 114a of the electric terminal set 113.

Here, the CPU 121 supplies power to external equipment in response to a power feed request from the external equipment. Also, the CPU 121 determines supplied power on the basis of the configuration of the interface cable 200 connected to the receptacle 101 and required power information sent from the electronic equipment 100B and controls the power supply section 124 such that the power is supplied to the external equipment.

The BD drive 411 records content data to a BD disc (not depicted) as a disc-shaped recording medium or reproduces content data from this BD. This BD drive 411 is connected to the internal bus 405 via the SATA interface 410. The MPEG decoder 415 acquires image and voice data by performing a decoding process on an MPEG2 stream reproduced by the BD drive 411.

In the case where image (video) and voice (audio) data is sent to the external equipment from the disc player 11, image and voice data is supplied from the MPEG decoder 415 to the communication section 122. In this case, image and voice data may be compressed or uncompressed.

The graphics generation circuit 416 performs, as necessary, a graphic data superimposition process on image data acquired by the MPEG decoder 415. The video output terminal 417 outputs image data output from the graphics generation circuit 416. The audio output terminal 418 outputs voice data acquired by the MPEG decoder 415.

The panel drive circuit 422 drives the display panel 423 on the basis of video (image) data output from the graphics generation circuit 416. The display control section 421 controls the display of the display panel 423 by controlling the graphics generation circuit 416 and the panel drive circuit 422. The display panel 423 includes, for example, an LCD (Liquid Crystal Display) panel, a PDP (Plasma Display Panel) panel, an organic EL (Organic Electro-Luminescence) panel, or other panel.

It should be noted that although, in the illustrated example, the disc player 11 has the display control section 421 in addition to a CPU 404, the CPU 404 may directly control the display of the display panel 423. Also, the CPU 404 and the display control section 421 may be integrated in a single chip or have a plurality of cores.

A brief description will be given of operation of the disc player 11 illustrated in FIG. 13. During recording, content data to be recorded is acquired via an undepicted digital tuner or from the network terminal 413 via the Ethernet I/F 412. This content data is input to the SATA interface 410 and recorded to the BD from the BD drive 411. Depending on the case, this content data may be recorded to an undepicted HDD (hard disk drive) that is connected to the SATA interface 410.

During reproduction, content data (MPEG stream) reproduced from the BD by the BD drive 411 is supplied to the MPEG decoder 415 via the SATA interface 410. In the MPEG decoder 415, a decoding process is performed on the reproduced content data, as a result of which uncompressed image and voice data is acquired. Image data is output to the video output terminal 417 through the graphics generation circuit 416. Also, voice data is output to the audio output terminal 418.

Also, during reproduction, image data acquired by the MPEG decoder 415 is supplied to the panel drive circuit 422 via the graphics generation circuit 416 in response to user operation, allowing the reproduced image to be displayed on the display panel 423. Also, voice data acquired by the MPEG decoder 415 is supplied to an undepicted speaker in response to user operation, allowing voice appropriate to the reproduced image to be output.

Also, in the case where image (video) and voice (audio) data is sent from the disc player 11 to the external equipment during this reproduction, image and voice data (uncompressed or uncompressed data) is supplied to the communication section 122 from the MPEG decoder 415 and sent to the external equipment.

It should be noted that when content data reproduced by the BD drive 411 is sent out to a network during reproduction, this content data is output to the network terminal 413 via the Ethernet I/F 412. Here, before being output, image data may be encrypted first using a copyright protection technique such as HDCP, DTCP, or DTCP+ and then transported (sent).

[Configuration Example of the Portable Image Display Apparatus]

Figure 14:
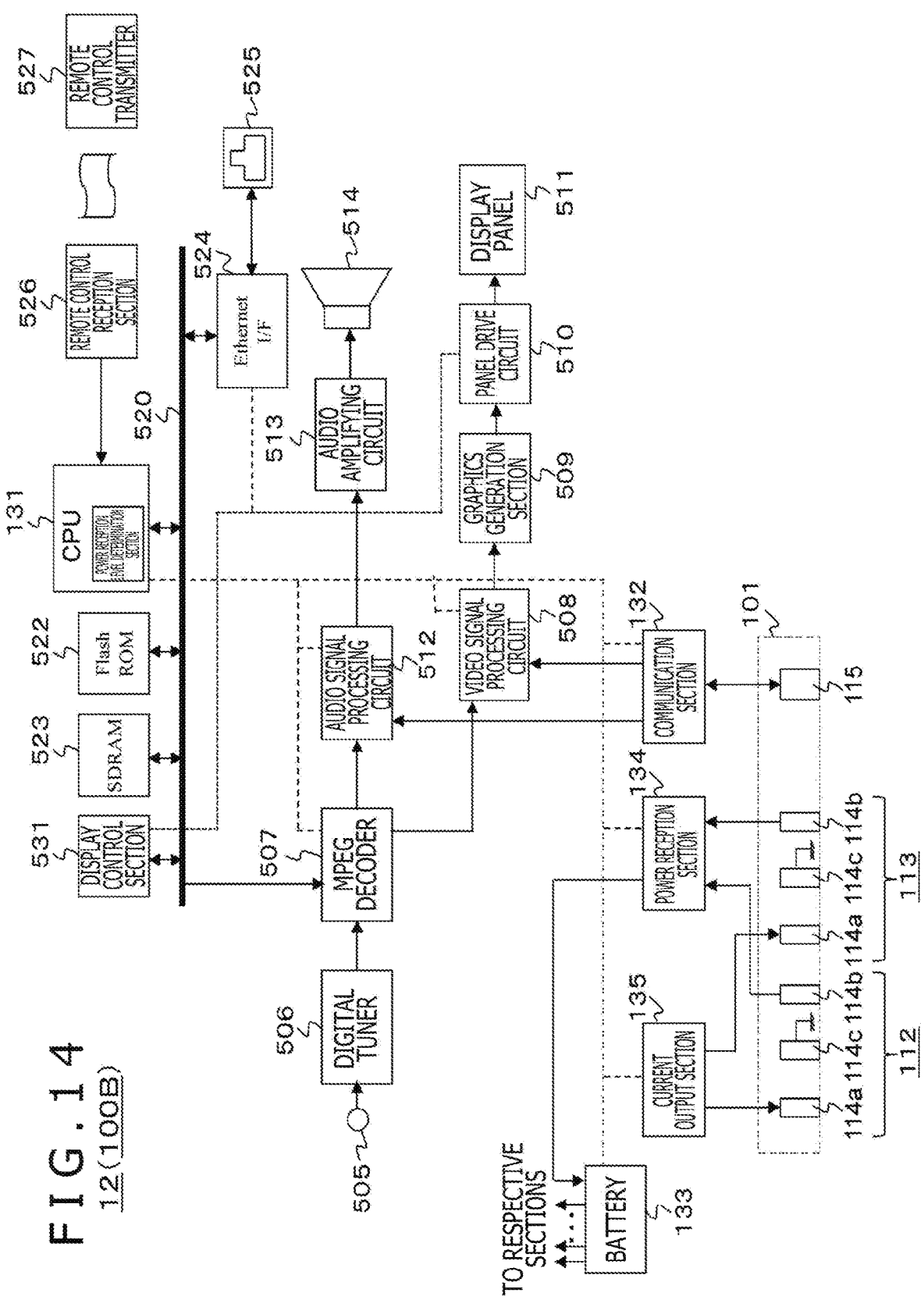
FIG. 14 is a block diagram illustrating a configuration example of a portable image display apparatus as a specific example of electronic equipment (power receiving side).

FIG. 14 illustrates a configuration example of the portable image display apparatus 12 as the electronic equipment 100B. In this FIG. 14, components corresponding to those in FIG. 8 are denoted by the same reference signs, and detailed description thereof will be omitted as appropriate.

The portable image display apparatus 12 has the receptacle 101, the communication section 132, the battery 133, the power reception section 134, and the current output section 135. The plug 201 of the "configuration 1 (refer to FIG. 3)" or "configuration 2 (refer to FIG. 5)" interface cable 200 is connected to the receptacle 101. This portable image display apparatus 12 is connected to the external equipment such as the disc player 11 described above through the interface cable 200.

Also, this portable image display apparatus 12 has an antenna terminal 505, a digital tuner 506, an MPEG decoder 507, a video signal processing circuit 508, a graphics generation circuit 509, a panel drive circuit 510, and a display panel 511.

Also, this portable image display apparatus 12 has an audio signal processing circuit 512, an audio amplifying circuit 513, a speaker 514, an internal bus 520, the CPU 131, a flash ROM 522, and an SDRAM (Synchronous Random Access Memory) 523.

Also, this portable image display apparatus 12 has an Ethernet interface (Ethernet I/F) 524, a network terminal 525, a remote control reception section 526, and a remote control transmitter 527. Also, this portable image display apparatus 12 has a display control section 531. It should be noted that "Ethernet" is a registered trademark. The CPU 131, the flash ROM 522, the SDRAM 523, the Ethernet interface 524, the MPEG decoder 507, and the display control section 531 are connected to the internal bus 520.

The CPU 131 controls the operation of respective sections of the portable image display apparatus 12. The flash ROM 522 stores control software and archives data. The SDRAM 523 configures a work area of the CPU 131. The CPU 131 loads software and data read from the flash ROM 522 into the SDRAM 523, activates the software, and controls the respective sections of the portable image display apparatus 12.

The remote control reception section 526 receives a remote control signal (remote control code) sent from the remote control transmitter 527 and supplies the remote control code to the CPU 131. The CPU 131 controls the respective sections of the portable image display apparatus 12 in accordance with this remote control code. It should be noted that although a remote control section is depicted as a user instruction input section in the illustrated example, the user instruction input section may be other component such as touch panel section that makes instruction input through proximity or touch, a gesture input section that detects instruction input with a mouse, a keyboard, or a camera, or an audio input section that makes instruction input by voice.

The communication section 132 communicates with the external equipment through the connection section 115. In this case, the communication section 132 receives image (video) data, voice (audio) data, and other media data from the external equipment. Also, the communication section 132 communicates various pieces of information with the external equipment. In this case, the communication section 132 sends information generated by the CPU 131 to the external equipment and supplies information received from external equipment to the CPU 131. Information sent to the external equipment includes power feed request information, required power information, and other information.

The current output section 135 outputs a current to the second electric terminals 114b of the electric terminal sets 112 and 113 provided on the receptacle 101. As a result, the external equipment can identify whether or not the interface cable 200 is connected to the receptacle 101 and further, in the case where the interface cable 200 is connected, can identify the configuration of the interface cable 200.

The battery 133 supplies power to respective sections of the portable image display apparatus 12. The CPU 131 checks the charge level of this battery 133 and, in the case where the CPU 131 decides that the battery 133 needs to be charged, determines required power, i.e., power to be supplied from the external equipment, and sends power feed request information and required power information to the external equipment from the communication section 132.

The power reception section 134 takes in the product of voltage and current, i.e., power acquired at either one of or both the electric terminal 114b of the electric terminal set 112 and the electric terminal 114b of the electric terminal set 113, thereby charging the battery 133. The CPU 131 sends power-feed-not-required information to the external equipment from the communication section 132 when the battery 133 is sufficiently charged.

The antenna terminal 505 is a terminal that inputs a TV broadcast signal received by a receiving antenna (not depicted). The digital tuner 506 processes a TV broadcast signal input to the antenna terminal 505 and extracts a partial TS (Transport Stream) (video data TS packet and audio data TS packet) from a given transport stream corresponding to the user-selected channel.

Also, the digital tuner 506 extracts a PSI/SI (Program Specific Information/Service Information) from the acquired transport stream and outputs the PSI/SI to the CPU 521. The process of extracting the partial TS of an arbitrary channel from the plurality of transport streams acquired by the digital tuner 506 is made possible by acquiring information regarding the packet ID (PID) of the arbitrary channel from the PSI/SI (PAT/PMT).

The MPEG decoder 507 acquires image data by performing a decoding process on a video PES (Packetized Elementary Stream) packet that includes the video data TS packet acquired by the digital tuner 506. Also, the MPEG decoder 507 acquires voice data by performing a decoding process on an audio PES packet that includes the audio data TS packet acquired by the digital tuner 506. Also, the MPEG decoder 507 acquires image and voice data by performing a decoding process on content data (image and voice data) supplied from the network terminal 525 via the Ethernet interface 524.

The video signal processing circuit 508 and the graphics generation circuit 509 perform, as necessary, a scaling process (resolution conversion process), a graphic data superimposition process, and other process on the image (video) data acquired by the MPEG decoder 507 or the image (video) data received by the communication section 132.

The panel drive circuit 510 drives the display panel 511 on the basis of video (image) data output from the graphics generation circuit 509. The display control section 531 controls the display of the display panel 511 by controlling the graphics generation circuit 509 and the panel drive circuit 510. The display panel 511 includes, for example, an LCD (Liquid Crystal Display) panel, a PDP (Plasma Display Panel) panel, an organic EL (Organic Electro-Luminescence) panel, or other panel.

It should be noted that although, in the illustrated example, an example is depicted in which the portable image display apparatus 12 has the display control section 531 in addition to the CPU 131, the CPU 131 may directly control the display of the display panel 511. Also, the CPU 131 and the display control section 531 may be integrated in a single chip or have a plurality of cores.

The audio signal processing circuit 512 performs a necessary process such as D/A conversion on the voice (audio) data acquired by the MPEG decoder 507 or the voice (audio) data received by the communication section 132. The audio amplifying circuit 513 amplifies the audio signal output from the audio signal processing circuit 512 and supplies the signal to the speaker 514.

It should be noted that the speaker 514 may be monaural or stereo. Also, there may be one speaker 514 or two or more speakers 514. Also, the speaker 514 may be an earphone or headphone. Also, the speaker 514 may support 2.1 channels, 5.1 channels or other channels. Also, the speaker 514 may be connected wirelessly to the portable image display apparatus 12. Also, the speaker 514 may be other piece of equipment.

It should be noted that when received content data is sent out to a network, for example, this content data is output to the network terminal 525 via the Ethernet interface 524. Here, before being output, image data may be encrypted first using a copyright protection technique such as HDCP, DTCP, or DTCP+ and then transported (sent).

The operation of the portable image display apparatus 12 illustrated in FIG. 14 will be described briefly. The TV broadcast signal input to the antenna terminal 505 is supplied to the digital tuner 506. This digital tuner 506 processes the TV broadcast signal, outputs a given transport stream corresponding to the user-selected channel, extracts a partial TS (video data TS packet and audio data TS packet) from the transport stream, and supplies the partial TS to the MPEG decoder 507.

The MPEG decoder 507 acquires image data by performing a decoding process on the video PES packet that includes the video data TS packet. This image data is subjected, as necessary, to a scaling process (resolution conversion process), a graphic data superimposition process, and other process by the video signal processing circuit 508 and the graphics generation circuit 509 and then supplied to the panel drive circuit 510. For this reason, the image corresponding to the user-selected channel appears on the display panel 511.

Also, the MPEG decoder 507 acquires voice data by performing a decoding process on the audio PES packet that includes the audio data TS packet. This voice data is subjected to necessary processes such as D/A conversion by the audio signal processing circuit 512, is further amplified by the audio amplifying circuit 513, and then supplied to the speaker 514. For this reason, the voice corresponding to the user-selected channel is produced from the speaker 514.

Also, content data (image data and voice data) supplied from the Ethernet interface 524 to the network terminal 525 is supplied to the MPEG decoder 507. From here onwards, the operation is similar to that described above when a TV broadcast signal is received, and an image appears on the display panel 511, and voice is produced from the speaker 514.

Also, in the case where the portable image display apparatus 12 receives image (video) and voice (audio) data from the external equipment, image and voice data received by the communication section 132 is supplied to the video signal processing circuit 508 and the audio signal processing circuit 512, respectively. From here onwards, the operation is similar to that described above when a TV broadcast signal is received, and an image appears on the display panel 511, and voice is produced from the speaker 514.

As described above, in the AV transport system 10 illustrated in FIG. 1, the electronic equipment 100A identifies the configuration of the interface cable 200 connected to the receptacle 101 on the basis of signals acquired from the second electric terminals 114b of the two electric terminal sets 112 and 113 and supplies power to the electronic equipment 100B through the first electric terminal 114a of one of the two electric terminal sets 112 and 113 or through the first electric terminals 114a of both thereof in accordance with the identification result. For this reason, excellent supply of power from the electronic equipment 100A to the electronic equipment 100B can be achieved in accordance with the configuration of the interface cable 200.

Also, in the AV transport system 10 illustrated in FIG. 1, the electric terminal sets 112 and 113 are provided respectively on two opposing faces of the rectangular opening section 111 in the receptacles 101 of the electronic equipment 100A and the electronic equipment 100B such that the first to third electric terminals 114a to 114c are lined up point-symmetrically. This allows for reversible connection of the interface cable 200, thus contributing to improved ease of use for users.

Also, in the AV transport system 10 illustrated in FIG. 1, the interface cable 200 has one or two electric terminal sets on the plug 201, and each of the electric terminal sets includes the first to third electric terminals 213. This makes it possible for the electronic equipment to readily identify the configuration of the interface cable 200. Also, a circuit or chip for configuration identification is not embedded in the plugs, thereby eliminating problems such as increased plug size and higher cost.

2. Modification Example

It should be noted that the above embodiment illustrates an example in which the electric terminal sets 112 and 113 are provided on the two opposing faces of the opening section 111 in the receptacles 101 of the electronic equipment 100A and the electronic equipment 100B. However, the two opposing faces may be horizontally opposing faces rather than vertically opposing faces as illustrated in FIG. 2. Also, the faces on which these two electric terminal sets 112 and 113 are provided need not necessarily be opposed to each other. For example, one possible option would be to provide the two electric terminal sets 112 and 113 side by side on the same face. Also, another possible option would be to provide three or more electric terminal sets in the receptacle 101 rather than limiting the number to two.

Also, although the above embodiment illustrates an example in which the electronic equipment 100A is used exclusively to supply power and the electronic equipment 100B is used exclusively to receive power, it is a matter of course that equipment can be configured to receive and supply power.

It should be noted that the present technology can have the following configurations:

(1) Electronic equipment including:
a receptacle having a plurality of electric terminal sets, in which
the electric terminal sets each include a first electric terminal for power, a second electric terminal for detection, and a third electric terminal for grounding, the electronic equipment further including:
a cable identification section adapted to identify a configuration of an interface cable connected to the receptacle on the basis of signals acquired from the second electric terminals of the plurality of electric terminal sets; and
a power supply section adapted to supply power to external equipment through the first electric terminals of some or all of the plurality of electric terminal sets in accordance with the identified cable configuration.

(2) The electronic equipment of feature (1), in which
the receptacle has the electric terminal set provided on each of two opposing faces of an opening section having an opening face of a given shape such that first to third electric terminals are lined up point-symmetrically.

(3) The electronic equipment of feature (1) or (2), in which
the receptacle further has a connection section for communication with external equipment, the electronic equipment further including:
a power feed level determination section adapted to determine supplied power on the basis of required power information received from the external equipment through the connection section and the identified cable configuration, in which
the power supply section supplies the determined supplied power to the external equipment.

(4) A power supply method of electronic equipment, the electronic equipment including
a receptacle having a plurality of electric terminal sets, in which
the electric terminal sets each include a first electric terminal for power, a second electric terminal for detection, and a third electric terminal for grounding, the power supply method including:
identifying a configuration of an interface cable connected to the receptacle on the basis of signals acquired from the second electric terminals of the plurality of electric terminal sets; and
supplying power to external equipment through the first electric terminals of some or all of the plurality of electric terminal sets in accordance with the identified cable configuration.

(5) Electronic equipment including:
a receptacle having a plurality of electric terminal sets, in which
the electric terminal sets each include a first electric terminal for power, a second electric terminal for detection, and a third electric terminal for grounding, the electronic equipment further including:
a current output section adapted to output a current to the first electric terminals of the plurality of electric terminal sets; and
a power reception section adapted to receive power supplied from external equipment at the second electric terminals of some or all of the plurality of electric terminal sets through an interface cable connected to the receptacle.

(6) The electronic equipment of feature (5), in which
the receptacle has the electric terminal set provided on each of two opposing faces of an opening section having an opening face of a given shape such that first to third electric terminals are lined up point-symmetrically.

(7) The electronic equipment of feature (5) or (6), in which
the receptacle further has a connection section for communication with external equipment, the electronic equipment further including:
a communication section adapted to send required power information to the external equipment through the connection section.

(8) The electronic equipment of feature (7), further including:
a battery adapted to store power received by the power reception section; and
a power reception level determination section adapted to determine required power on the basis of a charge level of the battery, in which
the communication section sends information regarding the determined required power to the external equipment.

(9) A power reception method of electronic equipment, the electronic equipment including
a receptacle having a plurality of electric terminal sets, in which
the electric terminal sets each include a first electric terminal for power, a second electric terminal for detection, and a third electric terminal for grounding, the power reception method including:
outputting a current to the second electric terminals of the plurality of electric terminal sets; and receiving power supplied from external equipment at the first electric terminals of some or all of the plurality of electric terminal sets through an interface cable connected to the receptacle.

(10) An interface cable including:

a plug having one or a plurality of electric terminal sets, in which the electric terminal set includes first to third electric terminals.

(11) The interface cable of feature (10), in which the plug has an insertion section that is to be inserted into an opening section of a receptacle of electronic equipment having an opening face of a given shape and that has an insertion face of a corresponding shape, and the electric terminal set is provided on a face of the insertion section corresponding to one of faces of the opening section.

(12) The interface cable of feature (10), in which the plug has an insertion section that is to be inserted into an opening section of a receptacle of electronic equipment having an opening face of a given shape and that has an insertion face of a corresponding shape, and the electric terminal set is provided on each of two faces of the insertion section corresponding to two opposing faces of the opening section.

REFERENCE SIGNS LIST

10 . . . AV transport system
11 . . . Disc player
12 . . . Portable display apparatus
100A, 100B . . . Electronic equipment
101 . . . Receptacle
111 . . . Opening section
112, 113 . . . Electric terminal set
114a . . . First electric terminal
114b . . . Second electric terminal
114c . . . Third electric terminal
115 . . . Connection section for communication
121 . . . CPU
122 . . . Communication section
123 . . . Power source section
124 . . . Power supply section
125 . . . Cable identification section
131 . . . CPU
132 . . . Communication section
133 . . . Battery
134 . . . Power reception section
135 . . . Current output section
200 . . . Interface cable
201 . . . Plug
211 . . . Insertion section
212, 216 . . . Electric terminal set
213 . . . Electric terminal
214 . . . Connection section for communication
215 . . . Metal wire
405 . . . Internal bus
406 . . . Flash ROM
407 . . . SDRAM
408 . . . Remote control reception section
409 . . . Remote control transmitter
410 . . . SATA interface
411 . . . BD drive
412 . . . Ethernet interface
413 . . . Network terminal
415 . . . MPEG decoder
416 . . . Graphics generation circuit
417 . . . Video output terminal
418 . . . Audio output terminal
421 . . . Display control section
422 . . . Panel drive circuit
423 . . . Display panel
505 . . . Antenna terminal
506 . . . Digital tuner
507 . . . MPEG decoder
508 . . . Video signal processing circuit
509 . . . Graphics generation circuit
510 . . . Panel drive circuit
511 . . . Display panel
512 . . . Audio signal processing circuit
513 . . . Audio amplifying circuit
514 . . . Speaker
520 . . . Internal bus
522 . . . Flash ROM
523 . . . SDRAM
524 . . . Ethernet interface
525 . . . Network terminal
526 . . . Remote control reception section
527 . . . Remote control transmitter
531 . . . Display control section

The invention claimed is:

1. An electronic equipment, comprising:

a receptacle that includes an opening section, a first electric terminal set, a second electric terminal set, and a connection section, wherein each of the first electric terminal set and the second electric terminal set includes a first electric terminal for power, a second electric terminal for detection of a current, and a third electric terminal for grounding, the opening section has an opening face of a specific shape, each of the first electric terminal set and the second electric terminal set is on a corresponding opposing face of two opposing faces of the opening section, the first electric terminal, the second electric terminal, and the third electric terminal of each of the first electric terminal set and the second electric terminal set are lined up point-symmetrically on the corresponding opposing face of the opening section, the third electric terminal is between the first electric terminal and the second electric terminal in each of the first electric terminal set and the second electric terminal set, the first electric terminal of the first electric terminal set is opposite to the second electric terminal of the second electric terminal set, and the second electric terminal of the first electric terminal set is opposite to the first electric terminal of the second electric terminal set;

a cable identification section configured to identify one of:

a first configuration of an interface cable connected to the receptacle, wherein the identification of the first configuration of the interface cable is based on connection of one of the first electric terminal set or the second electric terminal set to an electric terminal set of an external equipment, and the detection of the current in the second electric terminal of one of the first electric terminal set or the second electric terminal set, or a second configuration of the interface cable connected to the receptacle, wherein the identification of the second configuration of the interface cable is based on connection of the first electric terminal set and the second electric terminal set to two electric terminal sets of the external equipment, and the detection of the current in the second electric terminal of each of the first electric terminal set and the second electric terminal set;
a communication section configured to receive required power information from the external equipment through the connection section, wherein the required power information indicates power required by the external equipment;
a power feed level determination section configured to:
  determine the power required by the external equipment is greater than maximum power supplied by the interface cable;
  determine, based on the determination the power required by the external equipment is greater than the maximum power supplied by the interface cable, the electronic equipment is capable of supplying the maximum power supplied by the interface cable; and
  determine supplied power to the external equipment based on
    the determination the power required by the external equipment is greater than the maximum power supplied by the interface cable, and
    the determination the electronic equipment is capable of supplying the maximum power supplied by the interface cable; and
a power supply section configured to supply the determined supplied power to the external equipment through one of:
  the first electric terminal of one of the first electric terminal set or the second electric terminal set based on the identification of the first configuration, or
  the first electric terminal of each of the first electric terminal set and the second electric terminal set based on the identification of the second configuration.

2. The electronic equipment of claim 1, wherein
the connection section is on a bottom face side of the opening section, and
the bottom face side is different from the two opposing faces of the opening section.

3. A power supply method of an electronic equipment, the power supply method comprising:
in the electronic equipment comprising a receptacle having an opening section, a first electric terminal set, a second electric terminal set, and a connection section, wherein
  each of the first electric terminal set and the second electric terminal set includes a first electric terminal for power, a second electric terminal for detection of a current, and a third electric terminal for grounding,
  the opening section has an opening face of a specific shape,
  each of the first electric terminal set and the second electric terminal set is on a corresponding opposing face of two opposing faces of the opening section,
  the first electric terminal, the second electric terminal, and the third electric terminal of each of the first electric terminal set and the second electric terminal set are lined up point-symmetrically on the corresponding opposing face of the opening section,
  the third electric terminal is between the first electric terminal and the second electric terminal in each of the first electric terminal set and the second electric terminal set,
  the first electric terminal of the first electric terminal set is opposite to the second electric terminal of the second electric terminal set, and
  the second electric terminal of the first electric terminal set is opposite to the first electric terminal of the second electric terminal set:
identifying one of:
  a first configuration of an interface cable connected to the receptacle, wherein the identification of the first configuration of the interface cable is based on connection of one of the first electric terminal set or the second electric terminal set to an electric terminal set of an external equipment, and the detection of the current in the second electric terminal of one of the first electric terminal set or the second electric terminal set, or
  a second configuration of the interface cable connected to the receptacle, wherein the identification of the second configuration of the interface cable is based on connection of the first electric terminal set and the second electric terminal set to two electric terminal sets of the external equipment, and the detection of the current in the second electric terminal of each of the first electric terminal set and the second electric terminal set;
receiving required power information from the external equipment through the connection section, wherein the required power information indicates power required by the external equipment;
determining the power required by the external equipment is greater than maximum power supplied by the interface cable;
determining, based on the determination the power required by the external equipment is greater than the maximum power supplied by the interface cable, the electronic equipment is capable of supplying the maximum power supplied by the interface cable;
determining supplied power to the external equipment based on
  the determination the power required by the external equipment is greater than the maximum power supplied by the interface cable, and
  the determination the electronic equipment is capable of supplying the maximum power supplied by the interface cable; and
supplying the determined supplied power to the external equipment through one of:
  the first electric terminal of one of the first electric terminal set or the second electric terminal set based on the identification of the first configuration, or
  the first electric terminal of each of the first electric terminal set and the second electric terminal set based on the identification of the second configuration.

4. An electronic equipment, comprising:
a receptacle that includes an opening section, a first electric terminal set, a second electric terminal set, and a connection section, wherein
  each of the first electric terminal set and the second electric terminal set includes a first electric terminal for power, a second electric terminal for detection, and a third electric terminal for grounding,
  the opening section has an opening face of a specific shape,
  each of the first electric terminal set and the second electric terminal set is on a corresponding opposing face of two opposing faces of the opening section,
  the first electric terminal, the second electric terminal, and the third electric terminal of each of the first electric terminal set and the second electric terminal set are lined up point-symmetrically on the corresponding opposing face of the opening section,
the third electric terminal is between the first electric terminal and the second electric terminal in each of the first electric terminal set and the second electric terminal set,
the first electric terminal of the first electric terminal set is opposite to the second electric terminal of the second electric terminal set, and
the second electric terminal of the first electric terminal set is opposite to the first electric terminal of the second electric terminal set;
a current output section configured to output a current to the second electric terminal of each of the first electric terminal set and the second electric terminal set for identification of one of:
a first configuration of an interface cable connected to the receptacle, wherein the identification of the first configuration of the interface cable is based on connection of one of the first electric terminal set or the second electric terminal set to an electric terminal set of an external equipment, and the current in the second electric terminal of one of the first electric terminal set or the second electric terminal set, or
a second configuration of the interface cable connected to the receptacle, wherein the identification of the second configuration is based on connection of the first electric terminal set and the second electric terminal set to two electric terminal sets of the external equipment, and the current in the second electric terminal of each of the first electric terminal set and the second electric terminal set;
a communication section configured to send required power information to the external equipment through the connection section, wherein
the required power information indicates power required by the electronic equipment, and
the external equipment:
determines the power required by the electronic equipment is greater than maximum power supplied by the interface cable,
determines, based on the determination the power required by the electronic equipment is greater than the maximum power supplied by the interface cable, the external equipment is capable of supplying the maximum power supplied by the interface cable, and
determines supplied power to the electronic equipment based on the determination the power required by the electronic equipment is greater than the maximum power supplied by the interface cable, and the determination the external equipment is capable of supplying the maximum power supplied by the interface cable; and
a power reception section configured to receive the determined supplied power from the external equipment at one of:
the first electric terminal of one of the first electric terminal set or the second electric terminal set through the interface cable based on the first configuration, or
the first electric terminal of each of the first electric terminal set and the second electric terminal set through the interface cable based on the second configuration.

5. The electronic equipment of claim 4, further comprising:

a battery configured to store the received supplied power; and
a power reception level determination section configured to determine the power required by the electronic equipment based on a charge level of the battery.

6. A power reception method of an electronic equipment, the power reception method comprising:

in the electronic equipment including a receptacle having an opening section, a first electric terminal set, a second electric terminal set, and a connection section, wherein
each of the first electric terminal set and the second electric terminal set includes a first electric terminal for power, a second electric terminal for detection, and a third electric terminal for grounding,
the opening section has an opening face of a specific shape,
each of the first electric terminal set and the second electric terminal set is on a corresponding opposing face of two opposing faces of the opening section,
the first electric terminal, the second electric terminal, and the third electric terminal of each of the first electric terminal set and the second electric terminal set are lined up point-symmetrically on the corresponding opposing face of the opening section,
the third electric terminal is between the first electric terminal and the second electric terminal in each of the first electric terminal set and the second electric terminal set,
the first electric terminal of the first electric terminal set is opposite to the second electric terminal of the second electric terminal set, and
the second electric terminal of the first electric terminal set is opposite to the first electric terminal of the second electric terminal set:
outputting a current to the second electric terminal of each of the first electric terminal set and the second electric terminal set for identification of one of:
a first configuration of an interface cable connected to the receptacle, wherein the identification of the first configuration is based on connection of one of the first electric terminal set or the second electric terminal set to an electric terminal set of an external equipment, and the current in the second electric terminal of one of the first electric terminal set or the second electric terminal set, or
a second configuration of the interface cable connected to the receptacle, wherein the identification of the second configuration of the interface cable is based on connection of the first electric terminal set and the second electric terminal set to two electric terminal sets of the external equipment, and the current in the second electric terminal of each of the first electric terminal set and the second electric terminal set;
sending required power information to the external equipment through the connection section, wherein
the required power information indicates power required by the electronic equipment, and
the external equipment:
determines the power required by the electronic equipment is greater than maximum power supplied by the interface cable,
determines, based on the determination the power required by the electronic equipment is greater than the maximum power supplied by the interface cable, the external equipment is capable of supplying the maximum power supplied by the interface cable, and determines supplied power to the electronic equipment based on the determination the power required by the electronic equipment is greater than the maximum power supplied by the interface cable, and the determination the external equipment is capable of supplying the maximum power supplied by the interface cable; and receiving the determined supplied power from the external equipment at one of:
- the first electric terminal of one of the first electric terminal set or the second electric terminal set through the interface cable based on the first configuration, or
- the first electric terminal of each of the first electric terminal set and the second electric terminal set through the interface cable based on the second configuration.

7. An interface cable, comprising:

a plug that comprises:
- an insertion section insertable into an opening section of a receptacle of an electronic equipment, wherein the insertion section includes:
  - an insertion face of a shape corresponding to a specific shape of the opening section; and
  - a connection section, and
- an electric terminal set of the interface cable on at least one of two faces of the insertion section corresponding to at least one of two opposing faces of the opening section, wherein
  - the electric terminal set of the interface cable includes a first electric terminal for power, a second electric terminal for detection, and a third electric terminal for grounding,
  - the first electric terminal, the second electric terminal, and the third electric terminal of the electric terminal set of the interface cable are lined up point-symmetrically on a corresponding face of the insertion section,
  - the third electric terminal is between the first electric terminal and the second electric terminal,
  - the interface cable has one of:
    - a first configuration in which the electric terminal set of the interface cable is on one face of the two faces of the insertion section, or
    - a second configuration in which the electric terminal set of the interface cable is on each face of the two faces of the insertion section,
  - the second electric terminal is configured to supply a signal for identification of one of:
    - the first configuration of the interface cable, wherein the identification of the first configuration of the interface cable is based on connection of one of a first electric terminal set of the receptacle of the electronic equipment or a second electric terminal set of the receptacle of the electronic equipment to an electric terminal set of an external equipment, and detection of a current in a specific electric terminal of one of the first electric terminal set or the second electric terminal set of the receptacle of the electronic equipment, or
    - the second configuration of the interface cable, the identification of the second configuration of the interface cable is based on connection of the first electric terminal set and the second electric terminal set to two electric terminal sets of the external equipment, and the detection of the current in the specific electric terminal of each of the first electric terminal set and the second electric terminal set,
  - the connection section is configured to communicate required power information from the external equipment to the electronic equipment,
    - the required power information indicates power required by the external equipment,
  - the electronic equipment:
    - determines the power required by the external equipment is greater than maximum power supplied by the interface cable,
    - determines, based on the determination the power required by the external equipment is greater than the maximum power supplied by the interface cable, the electronic equipment is capable of supplying the maximum power supplied by the interface cable, and
    - determines supplied power to the external equipment based on the determination the power required by the external equipment is greater than the maximum power supplied by the interface cable, and the determination the electronic equipment is capable of supplying the maximum power supplied by the interface cable, and
  - the first electric terminal is configured to supply the determined supplied power from the electronic equipment to the external equipment.

8. The interface cable of claim 7, wherein the connection section is on a specific face of the insertion section, the specific face corresponds to a bottom face of the opening section, and the specific face of the insertion section is different from the two faces of the insertion section.

* * * * *